United States Patent [19]

Augenreich et al.

[11] 4,305,334
[45] Dec. 15, 1981

[54] TUBE-TYPE PRODUCT CONVEYOR APPARATUS

[75] Inventors: Klaus Augenreich, Wedel; Klaus Ropelius; Conrad Poppenhusen, both of Hamburg; Norbert Hering, Ratingen; Robert Thomas, Kaarst; Peter Bauer, Hamburg, all of Fed. Rep. of Germany

[73] Assignee: Mannesmann Aktiengesellschaft, Dusseldorf, Fed. Rep. of Germany

[21] Appl. No.: 55,349

[22] Filed: Jul. 6, 1979

[30] Foreign Application Priority Data

Jul. 10, 1978 [DE] Fed. Rep. of Germany ....... 2830255

[51] Int. Cl.³ .............................................. B61B 13/10
[52] U.S. Cl. .................................. 104/138 R; 104/290
[58] Field of Search ................... 104/138 R, 288, 292, 104/293, 130, 290; 74/572; 49/68

[56] References Cited

U.S. PATENT DOCUMENTS

| | | | |
|---|---|---|---|
| 3,630,153 | 9/1971 | Guimarin | 104/138 R |
| 3,796,164 | 3/1974 | Nogi et al. | 104/138 R |
| 3,954,064 | 5/1976 | Minovitch | 104/138 R |
| 4,075,948 | 2/1978 | Minovitch | 104/138 R |

FOREIGN PATENT DOCUMENTS

| | | |
|---|---|---|
| 448496 | 6/1936 | United Kingdom . |
| 631542 | 11/1949 | United Kingdom . |
| 855456 | 11/1960 | United Kingdom . |
| 1104746 | 2/1968 | United Kingdom . |
| 1200591 | 7/1970 | United Kingdom . |
| 1254589 | 11/1971 | United Kingdom . |
| 1343316 | 1/1974 | United Kingdom . |
| 1389459 | 4/1975 | United Kingdom . |

OTHER PUBLICATIONS

Deliver and Hoist; Germany 1970, Nr. 14, pp. 789, 790.

*Primary Examiner*—Richard A. Bertsch
*Attorney, Agent, or Firm*—Mandeville and Schweitzer

[57] ABSTRACT

The invention relates to conveyor apparatus, particularly for use in conveying large quantities of heavy bulky and/or dry materials over a long distance. Moreover, the apparatus of the invention may be constructed in out-of-the-way areas over deteriorated or difficult courses, such as rubble. This is achieved by the use of a tube-like elongated passage through which a plurality of joined conveyor cars pass. The elongated passage has openings in the bottom for receiving therealong spaced apart primary windings for a linear electric motor. The cars, in turn, have mounted in the bottom surface thereof the secondary of the motor. The apparatus includes air vents for accommodating air movements ahead of and behind the cars switching arrangements and provision for loading and unloading.

18 Claims, 17 Drawing Figures

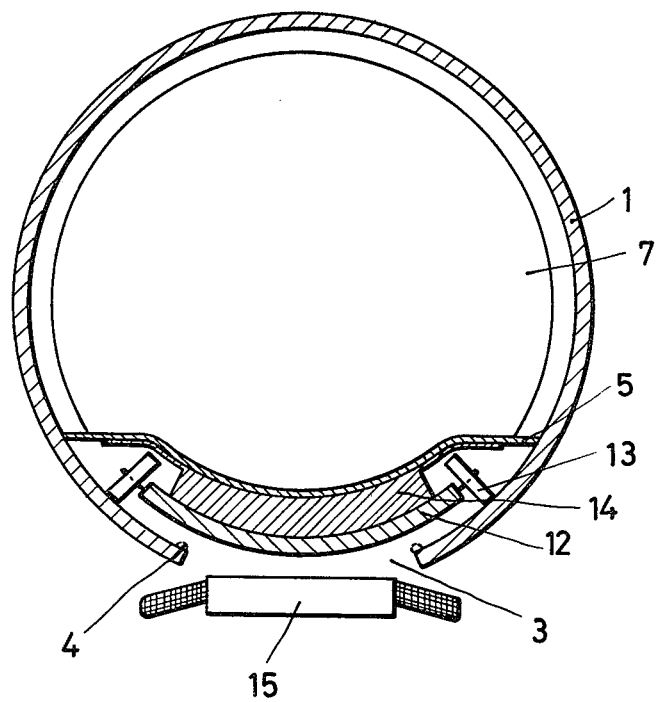
Fig. 3
Fig. 4
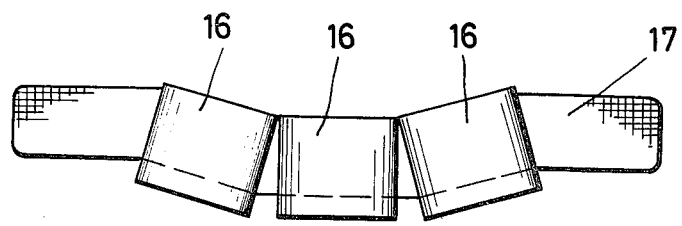

TUBE-TYPE PRODUCT CONVEYOR APPARATUS

BACKGROUND AND DESCRIPTION OF THE INVENTION

The invention relates to a conveyor with a conveyor train movable in a pipe by means of a linear motor drive, whereby the primary parts provided with coils are stationary, and the secondary parts are arranged on the conveyor train. Such conveyors can meet transport problems which, in difficult terrain, are only partially solved with conventional arrangements. For example, lines can be laid in riverbeds, in and/or on sand or rubble, in heavily settled urban areas, and in similar difficult areas.

Pipes are relatively easily handled, while at the same time they protect both material, as well as environment, and are therefore often used as means of transport for liquid and gaseous goods. However, if the goods delivered consist of solid granular material or piece goods, or if quantities delivered occur at irregular intervals, pipes alone do not meet the requirements. Therefore, additional transportable containers or a special conveyor system become necessary in the pipe. The usual hydraulic and pneumatic drives for this purpose are not economical for large quantities to be transported, heavy goods and long distances.

The magazine "Foerdern und Heben" (Deliver and Hoist), year of publication 20 (1970) No. 14, describes on pages 789 and 790 a conveyor with a linear motor arranged on top within the pipe to drive conveyor train cartridges which are guided along rails in the pipe. While it is true that this conveyor has a very good electric drive, due to the rails guiding the cartridge trains in the pipe, it is very involved and subject to breakdowns. The literature indicated also shows a belt conveyor arranged in the pipe, utilizing only a small portion of the pipe diameter.

It is, therefore, the object of this invention to provide a conveyor with conveyor trains driven by electro linear motors in a pipe which are simpler and more economical than heretofore. This is achieved by arranging the primary parts of the motor underneath the motor secondary with the latter attached to the bottom of the conveyor train. The conveyor train is stabilized against wobbling in the pipe by the fact that the center of gravity is located below the pipe center and, in addition, by utilizing the forces of attraction of the linear motor. Guide rails are, therefore, not necessary on a normal delivery line. This has not only advantages for safety in operation, as the conveyor train cannot get caught on any mounted parts, but also the arrangement permits a decrease in the pipe diameter corresponding to the throughput, since the pipes no longer have to be maintained by personnel from the inside. Therefore, lesser transport requirements may be met with the conveyor train in thin pipes. On account of the stationary arrangement of the primary motor parts, no sliding contacts are necessary, as is the case with trains with their own drive motors.

Utilization of the forces of attraction of the linear motor in connection with the center of gravity location below the pipe center as protection against wobbling encourages the construction of a light vehicle, consisting mainly of the motor secondary. These do not absolutely necessitate a tubular design but merely a slightly greater width than the iron package of the motor primary. Under the effect of centrifugal force in curves, a certain inclination of the train occurs despite the attraction forces of the linear motor. However, the vehicle also escapes the influence of the magnetic force, slows down and stabilizes again.

According to the invention, the motor primary lies flat, arranged in lower recesses and facing the secondary with their coils. Their sheet metal sections may be conformed to the curvature of the secondary part in a string fashion. The sheet metal sections are arranged in a string fashion. The sheet metal sections are arranged in a string and carry shared coils in their grooves. By fitting the primary parts to the secondary parts, the air gap is uniform and the degree of efficiency of the linear motor is high.

The distance between the individual primary sections along the path of travel is shorter than the length of the conveyor train provided with the secondary parts. Thus, at least one primary part is always effective. If the length of the train is about 300 m, for example, the motor primary sections are placed every 100 m. With inclines, the distances may also be shorter. They may also be provided with contact protection and designed so that in case of standstill of the conveyor train on the line caused by power failure, a momentary power line voltage increase to the $\sqrt{2}$-fold value becomes possible for twice the driving power.

As a further development of the invention, the conveyor train consists of individual connected parts supported in the pipe by means of support wheels or similar means, which are connected to each other via elastic clutches, or other adjacent elastic elements. The elasticity permits the passing of curves and switches and is not impaired by the secondary parts, which are joined together leaving only a slight distance. The advantage of this simple, light conveyor train is especially effective when the aluminum motor secondary parts—possibly supplemented by iron groundings which may form the basic frames for the parts and their wheels—are arranged as forms to receive further equipment for the vehicle. The adjacent front ends of the secondary parts and the iron groundings are rounded off, depending upon their approach during curves.

The carrier or tube for the goods delivered may also be an elastic pipe provided with a slot for loading and unloading on top, bound by sealing ridges, which are supported by annular springs placed at intervals and separable at the top. The slot for loading and unloading is slightly spread apart by a tool during loading, and by the delivered goods during unloading in an upside-down position, if the delivered goods lend themselves to trickling down, and if it is heavy enough. To this end, the conveyor train must drive onto a rail which has a 180° spiral coil in travel direction, whereby the conveyor train is turned around with its opening pointing down. Unloading can also be done by means of suction or scooping by means of spoon-like tools at low speed without turning the conveyor train. Continuous quick loading and unloading reduces time and labor required, and reduces the length of the train for a specific problem.

As a carrier for delivered goods, the conveyor train may have an elastic conveyor belt which is divided into individual containers for delivered goods by delivered goods keepers, preventing sliding of the goods delivered on steep inclines. To prevent air stagnation before the conveyor train and suction or vacuum following the conveyor train, the pipe is provided with overflow apertures leading to a shared overflow pipe. These may in part be the initially mentioned recesses for the primary motor parts which are thereby provided with good cooling.

The conveyor train may have branch lines with swingable switches for joined pipes, or with an intermittent pipe which is brought before other pipes by bending it. These pipes may be provided with stops in order to correctly maintain the pipe alignment. In hexagonal arrangement of the pipes, six additional pipes may be connected with the main pipe. The swiveling pipe may also contain a primary part.

Several examples of the invention are represented on the drawings and explained as follows.

DESCRIPTION OF THE DRAWINGS

FIG. 3 is a cross sectional view similar to FIG. 1, showing a further embodiment of the invention;

FIG. 4 shows one arrangement of the motor primary of the invention;

DETAILED DESCRIPTION OF THE INVENTION

Figure 1:
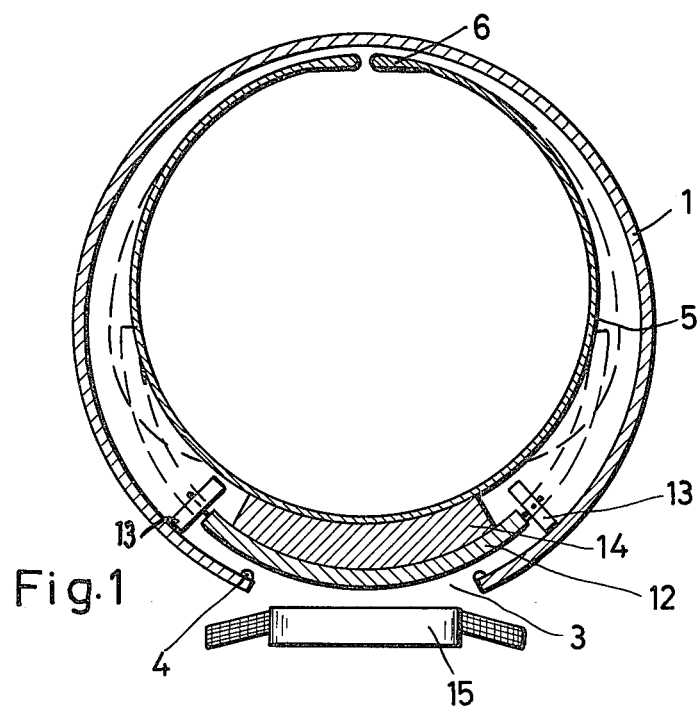
FIG. 1 is a cross sectional view of conveyor apparatus embodying the invention.
Figure 13:
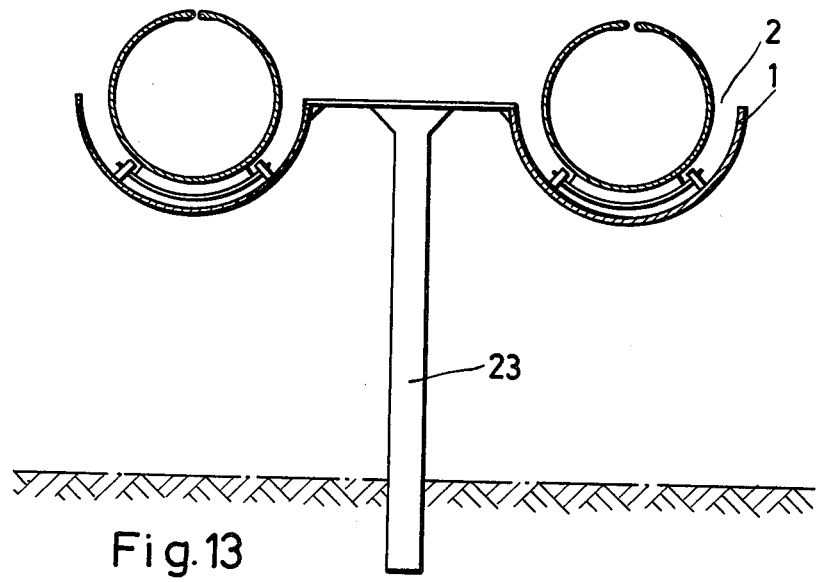
FIG. 13 is a cross sectional view of a dual conveyor system of the invention in the area of a discharge station.

FIG. 1 shows the pipe 1 of the conveyor with lower edge reinforcement 4 for recess 3, below which a linear motor primary part 15 is placed. The conveyor train 5, provided with an upper sealing ridge 6 or lip, travels in pipe 1 on wheels 13 of a chassis carrier, which largely forms a linear motor secondary part 12 and is additionally provided with an iron grounding support 14 for cooperation with the primary part 15. FIG. 1 shows in broken lines the bulge of a loaded conveyor train 5, which may be prevented by an extension of the secondary 12 and/or the iron grounding, also shown in broken line. Loading and unloading takes place at a loading and unloading station shown in FIG. 13, where pipe 1 is provided with an upper loading and unloading opening 2. In this area, pipes 1 are carried by supports 23.

Figure 2:
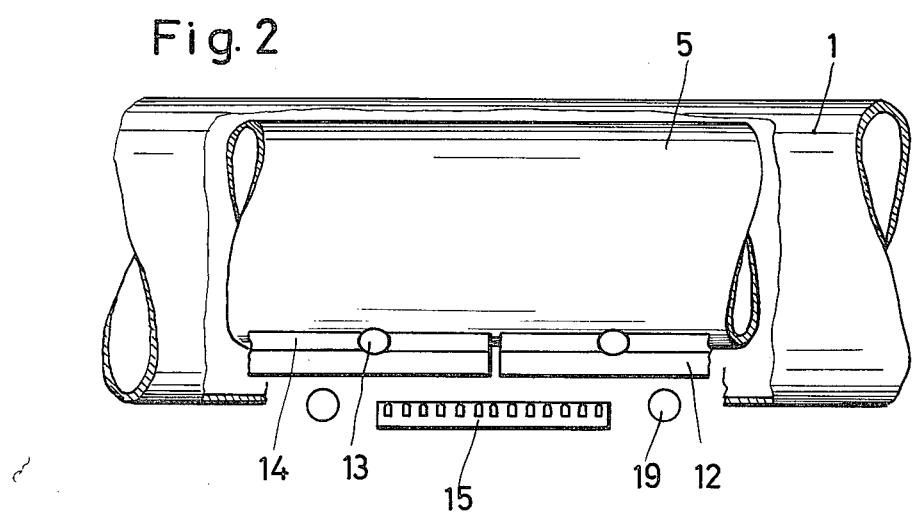
FIG. 2 is a side elevational view of the conveyor apparatus of FIG. 1, partially broken away to illustrate the positioning of the motor primary and secondary.

FIG. 2 shows a section of pipe 1 with conveyor train 5 formed as a long hose, an iron grounding 14 being arranged below it. Secondary part 12 is positioned above the motor primary 15. Rolls 19 are positioned at each end of the motor primary to engage the conveyor train 5 and protect the primary.

The embodiment shown in FIG. 3 shows the conveyor train 5 in the form of a flat belt extending to the pipe wall, which has attached delivered goods keepers 7 in the form of sheet metal webs, spaced therealong to keep the goods contained. The belt rests on spaced, successive chassis, already described in FIG. 1.

Figure 5:
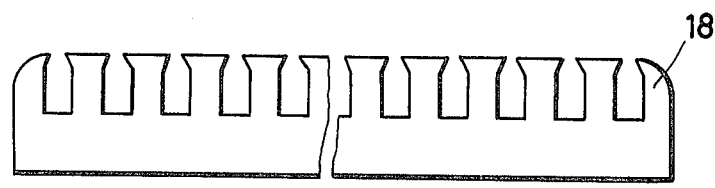
FIGS. 5, 6 and 7 show different embodiments of motor primary windings in accordance with the invention.
Figure 5:
Figure 6:
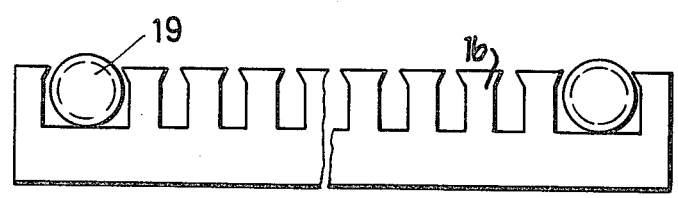
Figure 6:
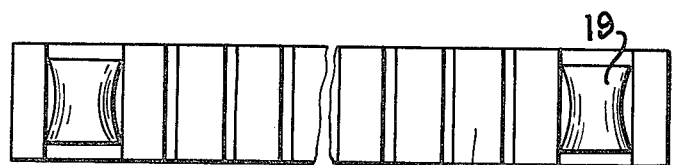
Figure 7:
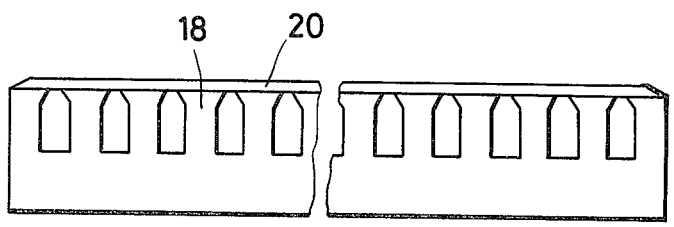
Figure 7:
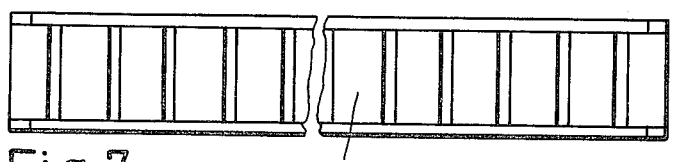

FIG. 4 shows a motor primary part curved to conform to the motor secondary, with sheet metal sections 16 for coils 17 upended against one another in a string. The primary part according to FIG. 5 has rounded-off grooved webs 18 at the ends of the sheet metal packages 16. The primary part according to FIG. 6 is provided with protective rolls 19 at the ends of sheet metal packages 16, and according to FIG. 7 a protective molding 20 is placed over the grooved webs 18.

Figure 8:
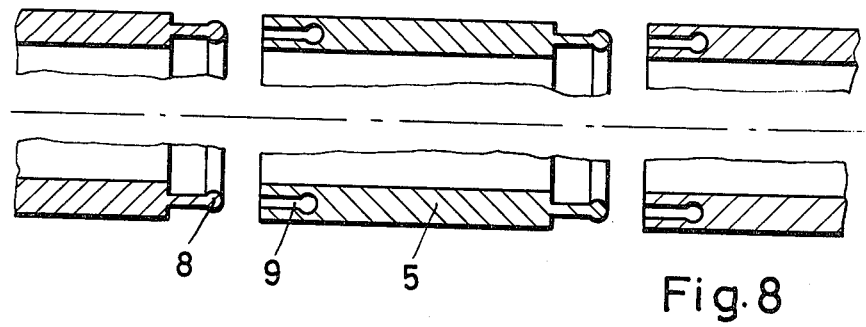
FIGS. 8, 9 and 10 illustrate different arrangements for joining the conveyor cars of the invention together.
Figure 9:
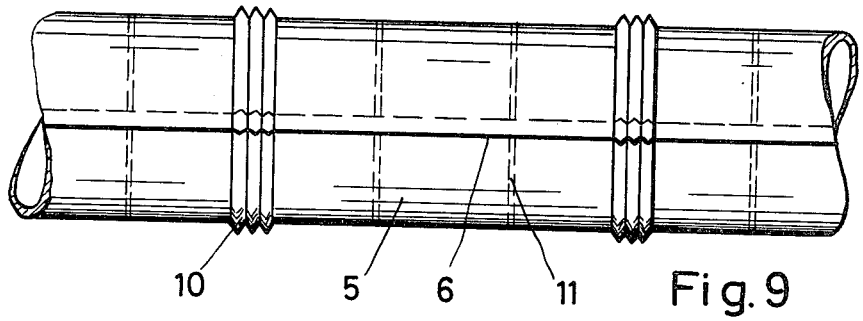
Figure 10:
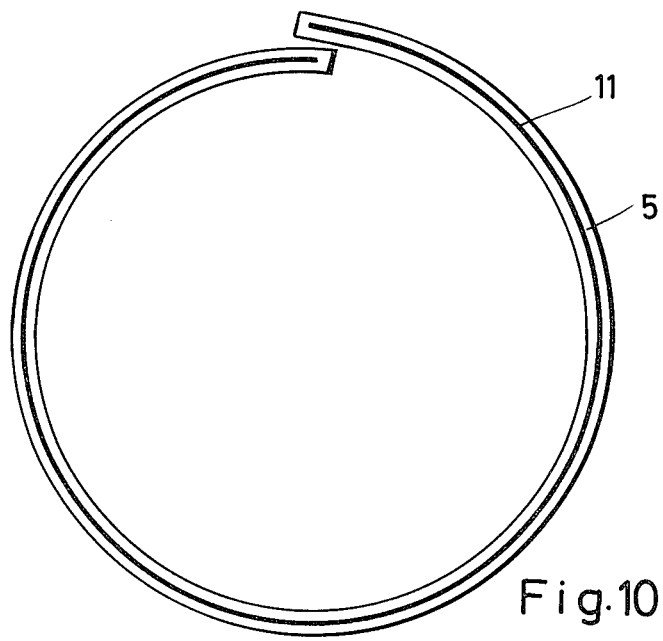

FIG. 8 shows one form of connection between the sections of a tubular conveyor train 5 by means of cooperating connecting ridges 8 and grooves 9. This connection is preferably arranged in the chassis center, thus being largely free of stress, since the chassis themselves are joined to each other. FIG. 9 shows bellows 10 between the sections of the conveyor train 5 with several annular springs 11, also shows on FIG. 10, to close the sealing ridge 6.

Figure 11:
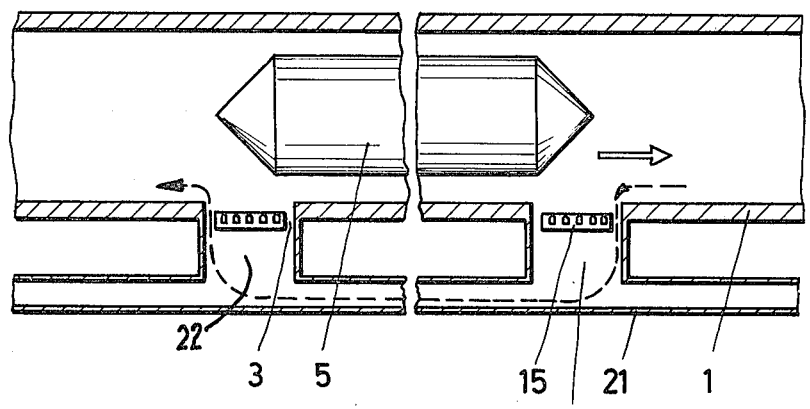
FIG. 11 is a longitudinal sectional view of the conveyor of the invention, illustrating one form of air ducts for the apparatus.
Figure 12:
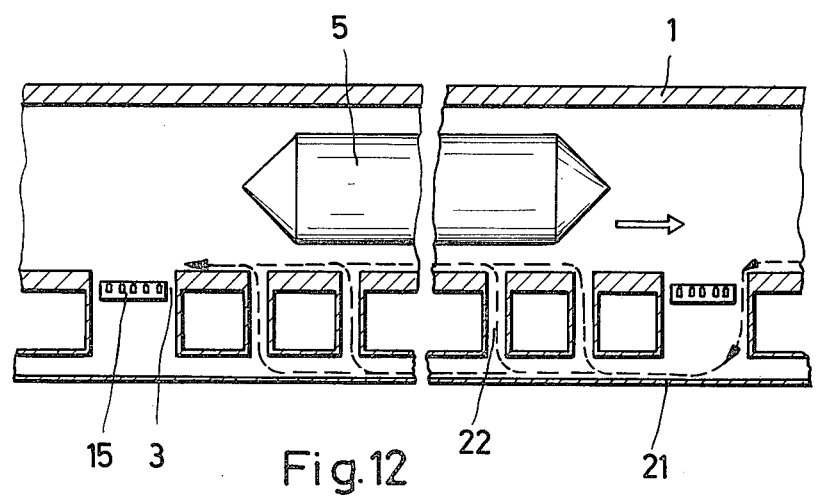
FIG. 12 is a longitudinal sectional view of the conveyor apparatus of the invention similar to FIG. 11, but illustrating a further form of air duct.

FIGS. 11 and 12 each show a conveyor train 5 in pipe 1, which has in the lower portion the already mentioned recesses 3 for receiving the primary parts 15 and, furthermore, overflow ducts 22 leading to an overflow pipe 21, so that the air may escape from the space before the conveyor train 5 from pipe 1 and flow to the space behind the conveyor train, while simultaneously cooling the motor primary parts 15. Between the primary parts 15, as shown, there would be, of course, at least one additional primary part which is not shown on FIGS. 11 and 12, which propels the conveyor train 5 towards the primary parts shown, since conveyor train 5 is always above at least one motor primary, as discussed previously.

Figure 14:
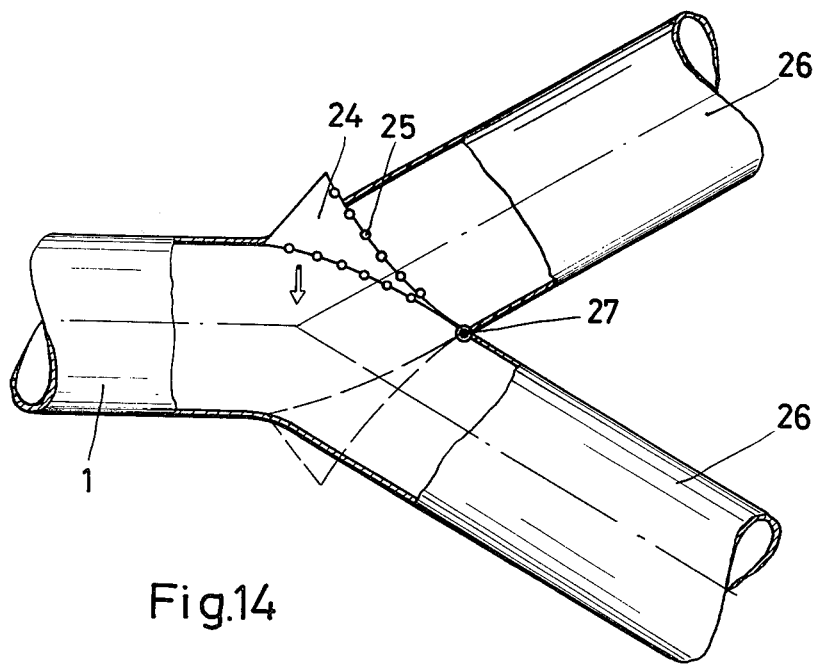
FIG. 14 is a somewhat diagrammatic top plan view of a switch of the invention.

FIG. 14 shows a branch of pipe 1 towards two branch pipes 26 via a switch 24 provided with rollers 25 and rotating around pivot 27, guiding a conveyor train to the lower branch pipe in the position shown. Switch 24 is shown in broken line in the other position. No motor primary part is provided in the branch area.

Figure 15:
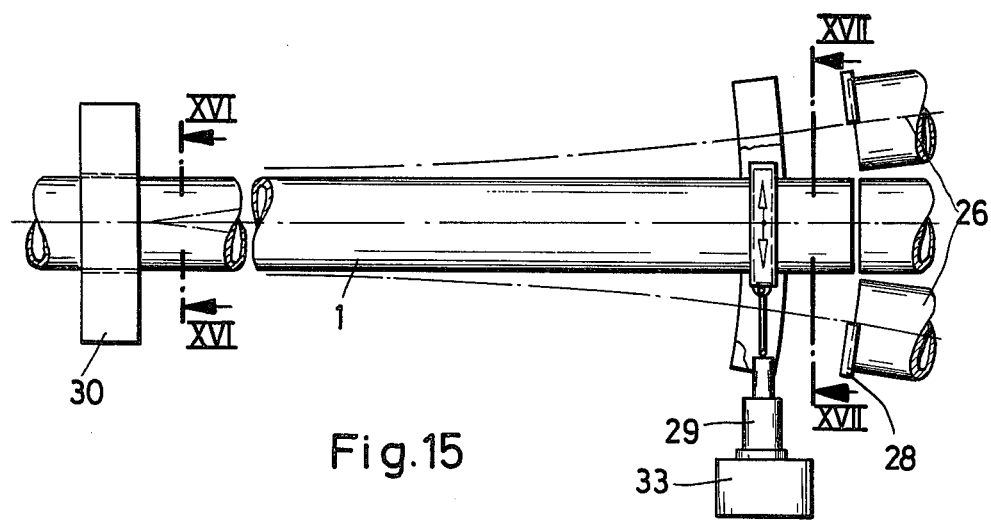
FIG. 15 is a somewhat diagrammatic top plan view illustrating a further embodiment of a switch of the invention.
Figure 16:
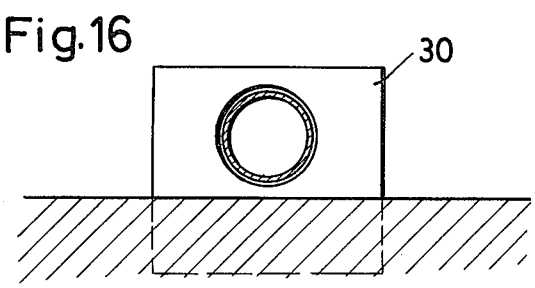
FIG. 16 is a sectional view along line XVI—XVI of FIG. 15.
Figure 17:
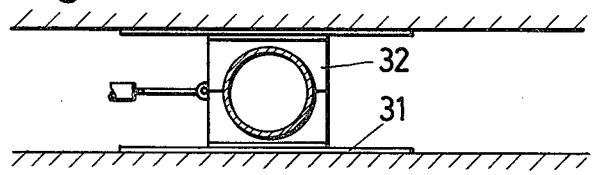
FIG. 17 is a sectional view along line XVII—XVII of FIG. 15.

In the branch line embodiment of FIGS. 15 through 17, the elasticity of pipe 1 is used to make a connection with branch pipes 26. The latter may, with the exception of the center pipe, have welded stops 28 for pipe 1 displaced by means of a hydraulic cylinder 29 and fastened in the support 30. In the area of the hydraulic cylinder, pipe 1 is surrounded by a sliding block 32 guided on rails 31. The hydraulic cylinder 29 rests on a foundation 33. If the pipe is of about 600 mm diameter, the foundation 33 is located at a distance of about 60 m from branch pipes 26.

I claim:
1. Tube-type conveyor apparatus, comprising
  (a) a tube-shaped conveyor passage;
  (b) a conveyor vehicle for said passage;
  (c) an electric linear drive motor for said conveyor vehicle; characterized by
  (d) a plurality of spaced recesses located at the bottom of said conveyor passage;

(e) a plurality of motor primary parts fixed in spaced alignment and positioned in said recesses;

(f) a motor secondary positioned on said vehicle in the bottom thereof; and (g) said secondary facing said spaced primary parts.

2. The apparatus of claim 1, further characterized by (a) each said primary part is comprised of a plurality of joined sections;

(b) said joined sections extending transversely of said conveyor passage; and (c) said joined sections positioned to conform to the shape of said opposed motor secondary.

3. The apparatus of claim 1, further characterized by (a) the distance between said spaced fixed primary parts is less than the length of said conveyor vehicle.

4. The apparatus of claim 1, further characterized by (a) guard means on said plurality of fixed motor primary parts to prevent contact therewith by said conveyor vehicle.

5. The apparatus of claim 1, further characterized by (a) said linear motor is designed for a momentary increase in the power line voltage to the $\sqrt{}$ two-fold nominal value for twice the power.

6. The apparatus of claim 1, further characterized by said conveyor vehicle comprising (a) a plurality of joined together sections; and (b) a plurality of wheels on each section.

7. The apparatus of claim 6, further characterized by (a) said plurality of sections are comprised of an elastic material.

8. The apparatus of claim 7, further characterized by (a) each said section including a motor secondary part; and (b) said secondary part forming the frame for said wheels.

9. The apparatus of claim 8, further characterized by (a) each said secondary includes an iron grounding.

10. The apparatus of claim 9, further characterized by (a) each said secondary and iron grounding is curved to conform to said conveyor passage.

11. The apparatus of claim 1, further characterized by (a) said tube shaped conveyor passage has a continuous opening along the top surface thereof;

(b) said conveyor passage is comprised of an elastic material; and (c) the opposed edges of said opening include sealing ridges.

12. The apparatus of claim 11, further characterized by (a) a plurality of spaced annular springs surrounding said conveyor passage; and (b) the opening of each said spring positioned at the top of said passage.

13. The apparatus of claim 1, further characterized by (a) said conveyor vehicle is in the form of an elastic flat belt-like structure.

14. The apparatus of claim 13, further characterized by (a) a plurality of spaced divider panels positioned along said belt-like structure.

15. The apparatus of claim 1, further characterized by (a) air ducts connecting said spaced recesses along said tube-shaped passage.

16. The apparatus of claim 1, further characterized by (a) a pivoting switch in said passage for joining said passage to branch passages.

17. The apparatus of claim 1, further characterized by (a) said conveyor passage is elastic;

(b) means connected to a section of said passage for pivoting one end thereof; and (c) said pivoting elastic end pivotable to several branch tube conveyor passages.

18. The apparatus of claim 1, further characterized by said pivoting means including (a) rails transverse of said conveyor passage;

(b) a sliding block surrounding said conveyor passage and movable on said rails; and (c) a reversible hydraulic cylinder connected for movement of said sliding block.

* * * * *